United States Patent
Li et al.

(10) Patent No.: US 10,742,347 B2
(45) Date of Patent: *Aug. 11, 2020

(54) BROADBAND HIGH-SPEED WAVELENGTH-DIVISION MULTIPLEXED RECEIVER USING MULTIPLE PHOTODETECTORS PER CHANNEL

(71) Applicant: Skorpios Technologies, Inc., Albuquerque, NM (US)

(72) Inventors: Guoliang Li, Albuquerque, NM (US); Murtaza Askari, Albuquerque, NM (US)

(73) Assignee: Skorpios Technologies, Inc., Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/224,409

(22) Filed: Dec. 18, 2018

(65) Prior Publication Data

US 2019/0379476 A1 Dec. 12, 2019

Related U.S. Application Data

(63) Continuation of application No. 15/237,355, filed on Aug. 15, 2016, now Pat. No. 10,200,142.
(Continued)

(51) Int. Cl.
*H04J 14/02* (2006.01)
*G02B 6/43* (2006.01)
(Continued)

(52) U.S. Cl.
CPC ............. *H04J 14/02* (2013.01); *G02B 6/00* (2013.01); *G02B 6/12004* (2013.01);
(Continued)

(58) Field of Classification Search
CPC combination set(s) only.
See application file for complete search history.

(56) References Cited

U.S. PATENT DOCUMENTS 6,330,378 B1 * 12/2001 Forrest ............... G02B 6/12002
372/50.21
7,061,669 B2 * 6/2006 Nakashima .......... H04B 10/291
359/341.41
(Continued)

FOREIGN PATENT DOCUMENTS

| CN | 101521836 A | 9/2009 |
|---|---|---|
| WO | 2012/167282 A1 | 12/2012 |
| WO | 2015-084332 A1 | 6/2015 |

OTHER PUBLICATIONS

Beling; Andreas, "Periodic Travelling Wave Photodetectorswith Serial and Parallel Optical Feed Based on InP"—Issue Available—Dec. 14, 2006—URI : urn:nbn:de:kobv:83-opus-14363 10.14279/depositonce-1485), Dec. 14, 2006 ,Technische Universitat Berlin,pp. 23-24,49,71,77.
(Continued)

*Primary Examiner* — Omar S Ismail
(74) *Attorney, Agent, or Firm* — Kilpatrick Townsend & Stockton

(57) ABSTRACT

An optical receiver, used in wavelength-division multiplexing, has multiple photodetectors per channel. The optical receiver comprises a demultiplexer to separate incoming light into different output waveguides, one output waveguide for each channel. A splitter is used in each output waveguide to split each output waveguide into two or more branches. A separate photodetector is coupled with each branch so that two or more photodetectors are used to measure each channel.

20 Claims, 6 Drawing Sheets

Related U.S. Application Data

(60) Provisional application No. 62/205,285, filed on Aug. 14, 2015.

(51) Int. Cl.

| | |
|---|---|
| *H04B 10/60* | (2013.01) |
| *G02B 6/293* | (2006.01) |
| *G02B 6/12* | (2006.01) |
| *G02B 6/00* | (2006.01) |
| *H04B 10/67* | (2013.01) |
| *G02B 6/42* | (2006.01) |
| *G02B 5/18* | (2006.01) |

(52) U.S. Cl.
CPC ......... *G02B 6/2931* (2013.01); *G02B 6/2938* (2013.01); *G02B 6/4215* (2013.01); *G02B 6/43* (2013.01); *H04B 10/60* (2013.01); *H04B 10/675* (2013.01); *G02B 5/1866* (2013.01); *G02B 2006/12097* (2013.01)

(56) References Cited

U.S. PATENT DOCUMENTS

| | | | | |
|---|---|---|---|---|
| 8,213,751 | B1* | 7/2012 | Ho | G02B 6/43 385/1 |
| 9,316,785 | B2 | 4/2016 | Krasulick et al. | |
| 9,726,841 | B1* | 8/2017 | Lin | G02B 6/4275 |
| 10,200,142 | B2 | 2/2019 | Li et al. | |
| 2001/0005438 | A1* | 6/2001 | Menezo | G02B 6/12019 385/15 |
| 2002/0097962 | A1* | 7/2002 | Yoshimura | G02B 6/26 385/50 |
| 2002/0126958 | A1* | 9/2002 | Maigne | G02B 6/12019 385/48 |
| 2003/0081898 | A1* | 5/2003 | Tabuchi | G02B 6/12011 385/37 |
| 2003/0108294 | A1* | 6/2003 | Zheng | G02B 6/12004 385/39 |
| 2004/0228373 | A1* | 11/2004 | Tatsuno | H01S 5/0687 372/29.02 |
| 2007/0183738 | A1* | 8/2007 | Welch | B82Y 20/00 385/147 |
| 2009/0103921 | A1* | 4/2009 | Frankel | H04B 10/2569 398/65 |
| 2011/0038631 | A1* | 2/2011 | Doerr | G02B 6/12014 398/65 |
| 2011/0064355 | A1* | 3/2011 | Soma | G02B 6/12019 385/14 |
| 2011/0268447 | A1* | 11/2011 | Kitoh | G02B 6/12016 398/82 |
| 2012/0163824 | A1* | 6/2012 | Rhee | H04B 10/548 398/79 |
| 2012/0224855 | A1* | 9/2012 | Liu | H04B 10/2543 398/79 |
| 2012/0251041 | A1* | 10/2012 | Ishikawa | G02B 6/12019 385/14 |
| 2013/0077980 | A1* | 3/2013 | Guo | H04B 10/61 398/214 |
| 2013/0294782 | A1* | 11/2013 | Liboiron-Ladouceur | H04B 10/616 398/202 |
| 2014/0086531 | A1 | 3/2014 | Park et al. | |
| 2014/0186040 | A1* | 7/2014 | Fujiwara | G02B 6/2808 398/66 |
| 2014/0367556 | A1 | 12/2014 | Lichtenegger et al. | |
| 2015/0219853 | A1 | 8/2015 | Kumar et al. | |
| 2015/0286005 | A1* | 10/2015 | Dumais | G02F 1/3136 385/16 |
| 2016/0266331 | A1* | 9/2016 | Hutchison | G02B 6/12016 |

OTHER PUBLICATIONS

Horst, et al.; "Silicon-on-Insulator Echelle Grating Wdm Demultiplexers with Two Stigmatic Points"; IEEE Photonics Technology Letters, vol. 21, No., 23; Dec. 1, 2009; pp. 1743-1745.

CN201680047614.2 received an office action dated Jun. 5, 2019, 11 pages.

International Search Report and Written Opinion dated Nov. 18, 2016 for International Application No. PCT/US2016/04 7066, filed Aug. 15, 2016; all pages.

* cited by examiner

BROADBAND HIGH-SPEED WAVELENGTH-DIVISION MULTIPLEXED RECEIVER USING MULTIPLE PHOTODETECTORS PER CHANNEL

CROSS-REFERENCES TO RELATED APPLICATIONS

This application is a continuation of U.S. patent application Ser. No. 15/237,355, filed on Aug. 15, 2016, entitled "Broadband High-Speed Wavelength-Division Multiplexed Receiver Using Multiple Photodetectors Per Channel," which application claims priority to U.S. Provisional Application No. 62/205,285, filed on Aug. 14, 2015, the disclosures of which are incorporated by reference in their entirety for all purposes.

BACKGROUND OF THE INVENTION

Optical wavelength-division multiplexing (WDM) combines multiple optical channels for parallel transmission through a waveguide. A multiplexer is used to combine the multiple optical channels. A demultiplexer is used to separate the multiple optical channels. An example of a demultiplexer is an arrayed waveguide grating. After separating the multiple optical channels, a photodetector is used to convert an optical signal of an optical channel into an electrical signal. Integrated circuits ("ICs"), especially silicon, have dominated the development of electronics and photonics. An example of a photodetector using Germanium on a silicon substrate is provided in PCT App. No. US2012/0408809, published as WO2012167282.

BRIEF SUMMARY OF THE INVENTION

Embodiments generally relate to devices, systems, and methods of an optical receiver used in wavelength-division multiplexing. In some embodiments, two or more photodetectors per optical channel are used (e.g., for faster receiver speed). A demultiplexer separates channels into separate output waveguides. A waveguide splitter (e.g., using tapers) is used to separate light from an output waveguide into two or more branches. Multiple, smaller photodetectors are used to detect light from branches instead of using a single, larger photodetector to detect light from one optical channel. In some embodiments, the optical receiver is formed on a silicon substrate. In some embodiments, the silicon substrate is a silicon-on-insulator (SOI) wafer and waveguides are formed in a device layer (e.g., crystalline silicon) of the SOI wafer.

In some embodiments, an optical receiver for wavelength-division multiplexing comprises a demultiplexer, an input waveguide optically coupled with the demultiplexer, a plurality of output waveguides coupled to the demultiplexer, a splitter, a first photodetector, and a second photodetector. Each output waveguide of the plurality of output waveguides is configured to receive light corresponding to one communication channel of a wavelength-division multiplexed signal (e.g., using a wavelength-division multiple access protocol). The splitter divides a first output waveguide of the plurality of output waveguides into a first branch and a second branch. The first photodetector is optically coupled with the first branch. The second photodetector is optically coupled with the second branch. In some embodiments, the first photodetector and the second photodetector are lateral PIN diode detectors (e.g., horizontally couples with the first branch or the second branch, wherein an interface between a device layer and a buried oxide layer of an SOI wafer is considered horizontal). In some embodiments, the demultiplexer, the input waveguide, the plurality of output waveguides, and the splitter are formed on a common substrate and/or formed in crystalline silicon (e.g., in a device layer of an SOI wafer). In some embodiments, the first photodetector and the second photodetector are integrated on the same substrate as the demultiplexer, the input waveguide, the plurality of output waveguides, and the splitter. In some embodiments, the demultiplexer is an echelle grating. In some embodiments, there are four optical channels and the optical receiver comprises eight photodetectors, two photodetectors per each of the four optical channels. In some embodiments, the first output waveguide has an initial width (e.g., width at an interface with an echelle grating) between 14 and 20 µm (e.g., equal to or greater than 14 µm and equal to or less than 20 µm). In some embodiments, the first photodetector is electrically coupled in parallel with the second photodetector.

In some embodiments, the first photodetector and/or the second photodetector has a width between 0.5 and 2.0 µm. In some embodiments, the splitter has tapers (e.g., edges formed by etching crystalline silicon to form a waveguide that narrows). In some embodiments, shoulder tapers and/or ridge tapers are used. In some embodiments, other semiconductor material, besides silicon, is used to form waveguides and/or the demultiplexer (e.g., III-V compounds, such as GaAs, GaP, InP, AlGaAs, and InGaAsP).

In some embodiments, a method for using an optical receiver in wavelength-division multiplexing comprises: coupling light into an input waveguide, wherein light coupled into the input waveguide comprises a multiple of wavelengths, and the multiple of wavelengths correspond to a plurality of communication channels in wavelength-division multiplexed communication; transmitting light from the first waveguide to a demultiplexer; separating light, using the demultiplexer, into a multiple of wavelength bands, wherein each wavelength band of the multiple wavelength bands corresponds to a communication channel of the plurality of communication channels; coupling the multiple of wavelength bands into a plurality of output waveguides, wherein each output waveguide of the plurality of output waveguides receives a wavelength band corresponding to a single communication channel of the plurality of communication channels, and the plurality of output waveguides includes a first output waveguide; and detecting, using two or more photodetectors, light coupled into the first output waveguide. In some embodiments, the method for using the optical receiver further comprises splitting light coupled into the first output waveguide into a first branch and into a second branch. In some embodiments, light coupled into the first branch and into the second branch is split evenly between the first branch and the second branch. In some embodiments, the method further comprising receiving an electrical signal from the first photodetector and the second photodetector electrically connected in parallel.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Embodiments generally relate to an optical receiver, components, and/or methods used for wavelength-division multiplexed communication. The optical receiver uses multiple photodetectors per channel (e.g., to increase electrical bandwidth of the receiver). The optical receiver comprises an input waveguide, a demultiplexer, output waveguides from the demultiplexer, splitters, and photodetectors. The input waveguide receives a combined optical beam. The combined optical beam comprises multiple frequencies of light for a multiple of communication channels. The combined optical beam is transmitted to the demultiplexer. The demultiplexer separates the multiple frequencies of light into the output waveguides. One output waveguide is used per communication channel. Instead of a single photodetector per communication channel, two or more photodetectors are used to receive light from a single output waveguide, which corresponds to a single communication channel. In some embodiments, using two or more photodetector per channel increases a bandwidth of the receiver.

Figure 1:
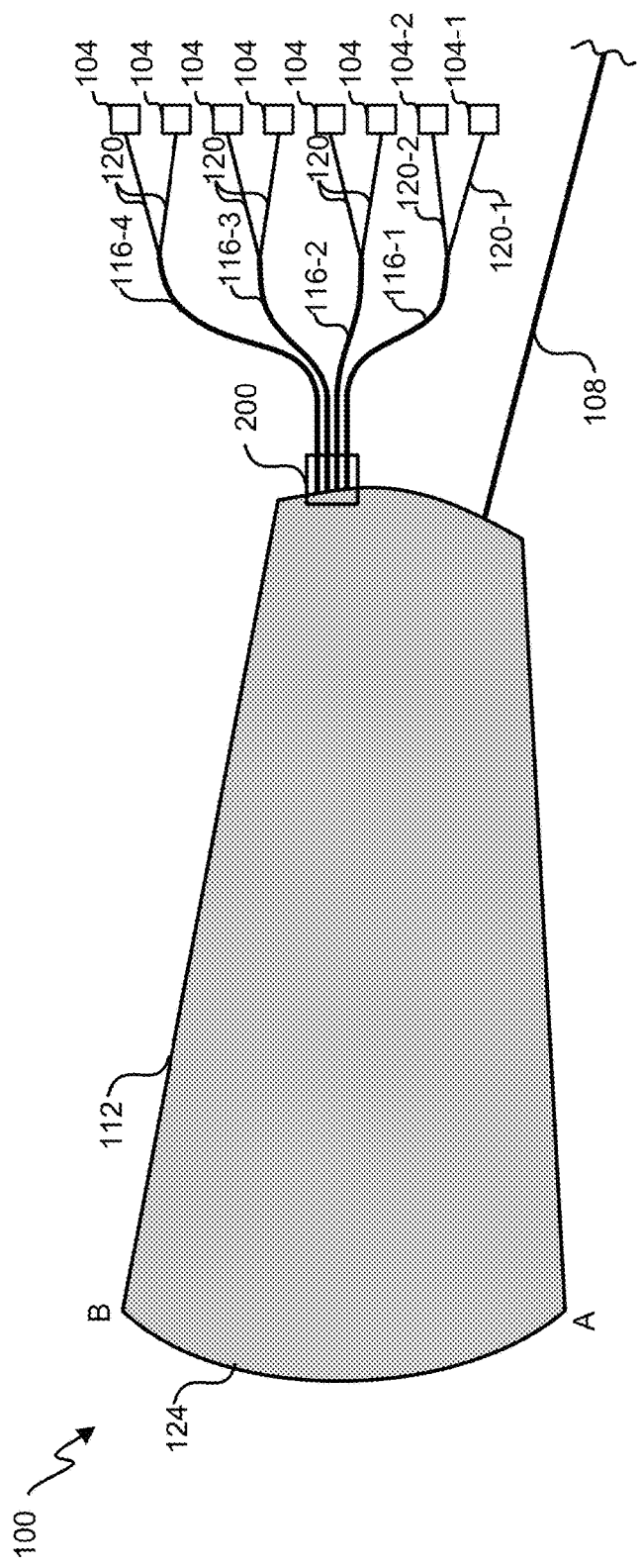
FIG. 1 depicts a simplified diagram of an embodiment of a receiver having multiple photodetectors per channel used for wavelength-division multiplexing.

Referring first to FIG. 1, a simplified diagram of an embodiment of a receiver 100 with multiple photodetectors 104 per communication channel is shown. The receiver 100 comprises an input waveguide 108, a demultiplexer 112, a plurality of output waveguides 116, and a plurality of photodetectors. Each of the plurality output waveguides 116 separates into two branches 120. One photodetector 104 of the multiple photodetectors is optically coupled with one branch so that there are two photodetectors 104 per output waveguide 116.

The input waveguide 108 is a semiconductor waveguide. In some embodiments, the input waveguide 108 is made of crystalline silicon. For example, the receiver 100 is built on a silicon-on-insulator (SOI) wafer. The SOI wafer comprises a handle portion, a buried oxide (BOX) portion, and a device layer. The input waveguide is formed in the device layer of the SOI wafer, with the BOX portion acting as an under cladding for the waveguide.

The input waveguide 108 receives an optical beam from an optical fiber. The optical beam is a combined optical beam. An optical coupler is used to couple the combined optical beam from the optical fiber into the input waveguide 108. An example of an optical coupler is given in U.S. patent application Ser. No. 14/615,942, filed on Feb. 6, 2015, the disclosure of which is incorporated by reference.

The combined optical beam is transmitted from the optical fiber to the demultiplexer 112 through the input waveguide 108. In the embodiment shown, the demultiplexer 112 is an echelle grating. In some embodiments, an echelle grating is used to reduce a size of the receiver 100 on a chip as compared to an arrayed waveguide grating (e.g., echelle gratings are about half the size of an arrayed waveguide grating) and/or are more fabrication tolerant (e.g., echelle gratings are more stable than micro-rings). In some embodiments, the echelle grating is used to separate light having broad channel spacing (e.g., broad channel spacing is 20 μm).

The echelle grating comprises a mirror 124. The echelle grating is formed in silicon (e.g., in crystalline silicon; in the device layer of an SOI wafer). The mirror 124 is formed by etching the device layer of the SOI wafer. The mirror 124 is a grating (e.g., mirror 124 isn't a smooth arc from point A to point B, but has many small angled facets at a predetermined blaze angle). In some embodiments, the mirror 124 comprises a metal (e.g., Al, Ag, Au, Cu, and/or W). For example, the metal is applied (e.g., deposited) where the device layer of the SOI wafer was removed by etching to form the mirror 124. In some embodiments, the mirror 124 is formed by a multiple of distributed Bragg reflectors (DBRs) etched behind each angled surface of the grating. In some embodiments, the mirror 124 is formed by using retro-reflecting surfaces. An example of a retro-reflecting echelle grating is given in Folkert Horst, et al., IEEE Photonics Technology Letters, Vol. 21, No. 23, Dec. 1, 2009.

The mirror 124 is curved and images different frequency components of the combined optical beam from the input waveguide 108 into the plurality of output waveguides 116. The output waveguides 116 are also formed in the device layer of the SOI wafer. The receiver 100 comprises four output waveguides 116: a first output waveguide 116-1, a second output waveguide 116-1, a third output waveguide 116-3, and a fourth output waveguide 116-4. The first output waveguide 116-1 receives frequencies corresponding to a first communication channel, the second output waveguide 116-2 receives frequencies corresponding to a second communication channel, the third output waveguide 116-3 receives frequencies corresponding to a third communication channel, and the fourth output waveguide 116-4 receives frequencies corresponding to a fourth communication channel.

Each output waveguide 116 separates into two branches 120. For example, the first output waveguide 116-1 splits into a first branch 120-1 and a second branch 120-2. In some embodiments, the branches 120 are formed in crystalline silicon (e.g., in the device layer of the SOI wafer). A photodetector 104 is optically coupled with each branch 120. For example, a first photodetector 104-1 is optically coupled with the first branch 120-1, such that the first optical detector 104-1 receives light transmitted through the first branch 120-1. A second photodetector 104-2 is optically coupled with the second branch 120-2, such that the second optical detector 104-2 receives light transmitted through the second branch 120-2.

In some embodiments, photodetectors 104 are waveguide photodetectors with lateral PIN junctions. In some embodiments, lateral junction Germanium (Ge) photodetectors are used (e.g., grown on silicon to be optically coupled with the branches 120).

Figure 2:
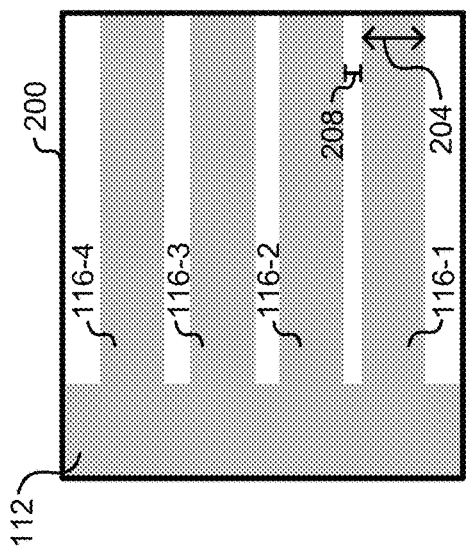
FIG. 2 depicts a simplified diagram of an embodiment of output waveguides coupled with a demultiplexer.

Inset 200 is identified in FIG. 1. Inset 200 is shown in FIG. 2. FIG. 2 depicts a simplified diagram of an embodiment of output waveguides 116 coupled with the demultiplexer 112. The output waveguides 116 have a width 204, W. A distance between output waveguides 116 is referred to as a gap 208, G. The demultiplexer 112 (e.g., an echelle grating in the embodiment shown for receiver 100) reflects light from the input waveguide 108 and focuses different wavelengths of light to different output waveguides 116 using mirror 124 (thus demultiplexing combined channels).

An achievable optical passband bandwidth (BW), at 1 dB, for each channel depends on channel wavelength spacing ($\Delta\lambda$) when using an echelle grating with photodetectors 104 having lateral junctions. In some embodiments, a BW/$\Delta\lambda$, ratio of greater than 70%, 80%, and/or 90% can be achieved. A higher BW/$\Delta\lambda$, ratio means a better filter for differentiating channels.

In an example application, IEEE CWDM4 standard defines a four channel WDM system with 20 nm channel spacing, with an optical channel bandwidth of 13 nm over temperature and polarization changes. Silicon photonics demultiplexer channel wavelengths can shift about 4 nm over a 0 C-70 C temperature. Different polarizations can deviate by ~1 nm. Thus, in some embodiments, a target 18 nm optical channel bandwidth centered on a middle point of a temperature range is used.

The width 204 and the gap 208 determine optical channel bandwidth of light coupled into the output waveguide 116. The BW/$\Delta\lambda$, ratio is roughly proportional to a W/(W+G) ratio. The gap 208 is limited by fabrication tolerances. In some embodiments, the gap 208 is between 0.8 and 2 µm (e.g., 1.0, 1.1, 1.2, 1.3 and/or 1.4 µm. to 1 µm. Output waveguides 116 having a large (e.g., 9 µm-20 µm) width 204 are used to achieve a broad band receiver. The width 204 can then be tapered down (e.g., to 4 µm) before being connected to a photodetector 104. But a final width cannot be too narrow because the final width needs to be able to support many optical modes since many optical modes are used to provide wide optical channel bandwidth.

Figure 3:
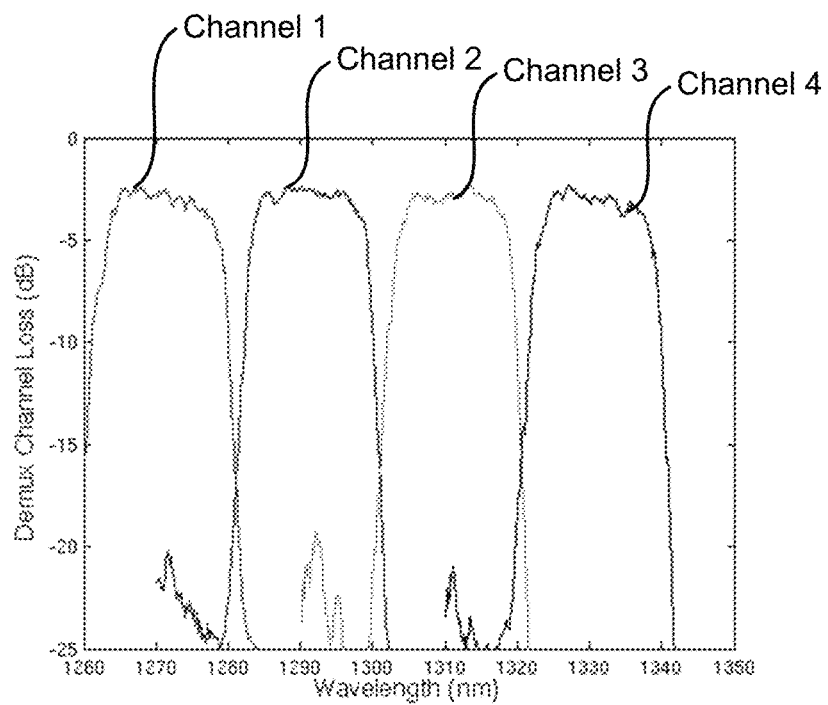
FIG. 3 depicts examples of measured channel response spectra for an embodiment of a receiver using four communication channels.

FIG. 3 shows a measured channel response spectrum for an embodiment using four communication channels. In the CWDM4 example, 18 nm optical channel bandwidth with 20 nm channel spacing is used. If a minimum gap 208 between output waveguides 116 is limited to 1 µm (e.g., because of fabrication tolerances), the output waveguides 116 are made having a width 204 between 9 to 18 µm (e.g., 15 to 17 µm, such as 16 µm), or greater. Other widths could be used. A width 204 greater than 16 µm or 18 µm can be used, but the tradeoff is a longer and/or wider echelle grating.

To achieve a broad optical channel bandwidth (e.g., a more flat-top spectrum), waveguides supporting multiple modes (e.g., at least 15, 20, or 25 modes) are used in the width 204 (e.g., direction of W). In some embodiments, a broad optical channel bandwidth is used to increase misalignment tolerance (e.g., less sensitive to temperature). In some embodiments, a single-mode center is used in a vertical direction (e.g., 0.5 µm thick). In some embodiments, an SOI wafer with a device layer 0.9 µm to 1.8 µm is used for more efficient coupling for other devices (e.g., coupling to a gain medium as described in U.S. patent application Ser. No. 14/509,914, filed on Oct. 8, 2014, which is incorporated by reference.

To support 20 optical modes, at wavelengths of about 1.3 µm, the output waveguides 116 are not narrower than about 4 µm. Thus the output waveguides 116 can be tapered from 16 µm down to 4 µm. If a single output waveguide 116 is narrowed to less than 4 µm, higher-order modes will leak out of a waveguide and not couple into the photodetector 104. Thus in some embodiments, a single output waveguide 116 isn't narrowed to less than 4 µm. If the output waveguide 116 is at least 4 µm wide, then a Ge photodetector 104 should be at least 4 µm wide to collect the power in the optical modes.

Figure 4:
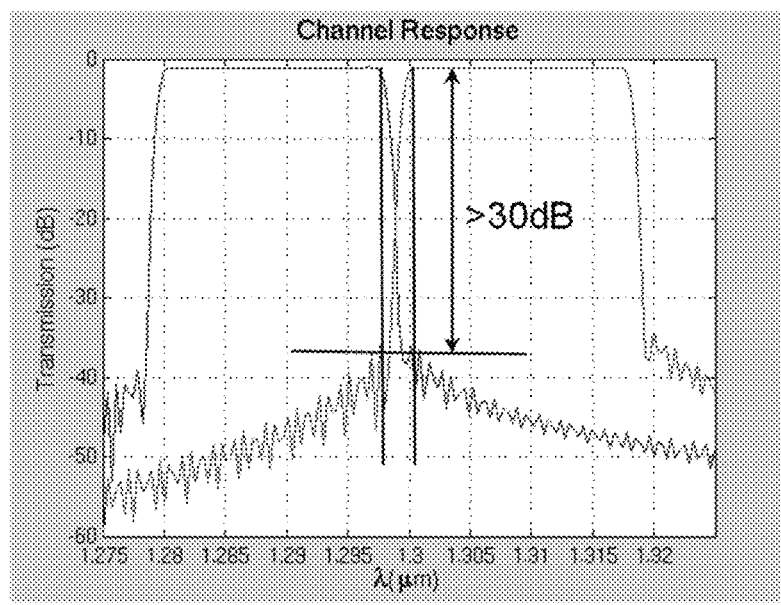
FIG. 4 depicts an example of crosstalk between a second channel and a third channel of WDM communication.

FIG. 4 depicts an example of crosstalk between a second channel and a third channel. The demultiplexer 112 is designed to limit crosstalk from channel 2 in channel 3 to less than −30 dB. The demultiplexer 112 is designed to limit crosstalk of channel 3 in channel 2 to less than −30 dB. Other embodiments have different designs to limit different levels of crosstalk between channels (e.g., crosstalk less than −20, −25, −30, or −40 dB).

Figure 5:
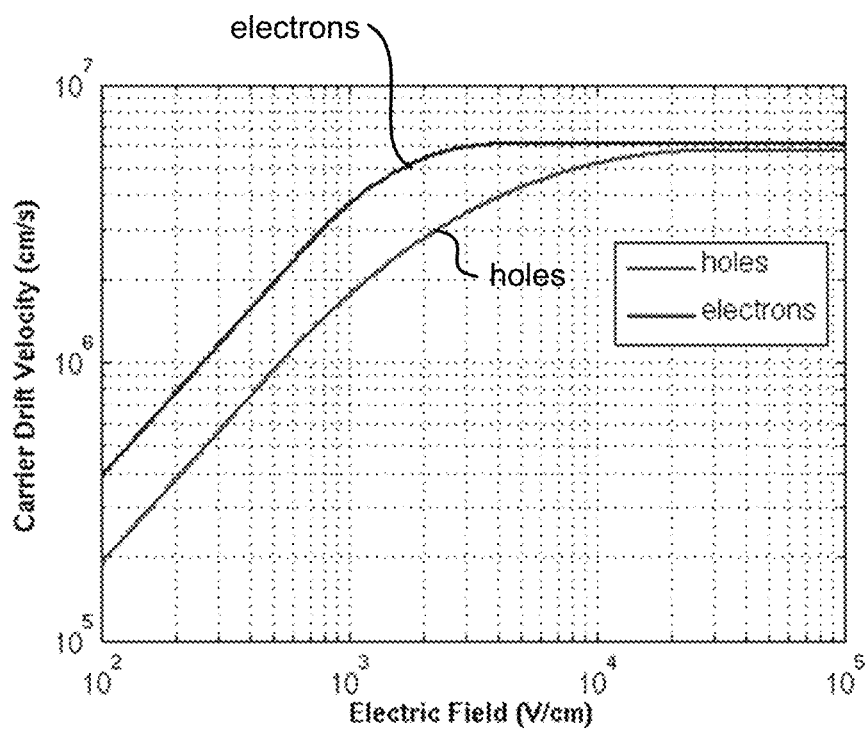
FIGS. 5 & 6 are graphs relating to example characteristics of germanium photodetectors.
Figure 6:
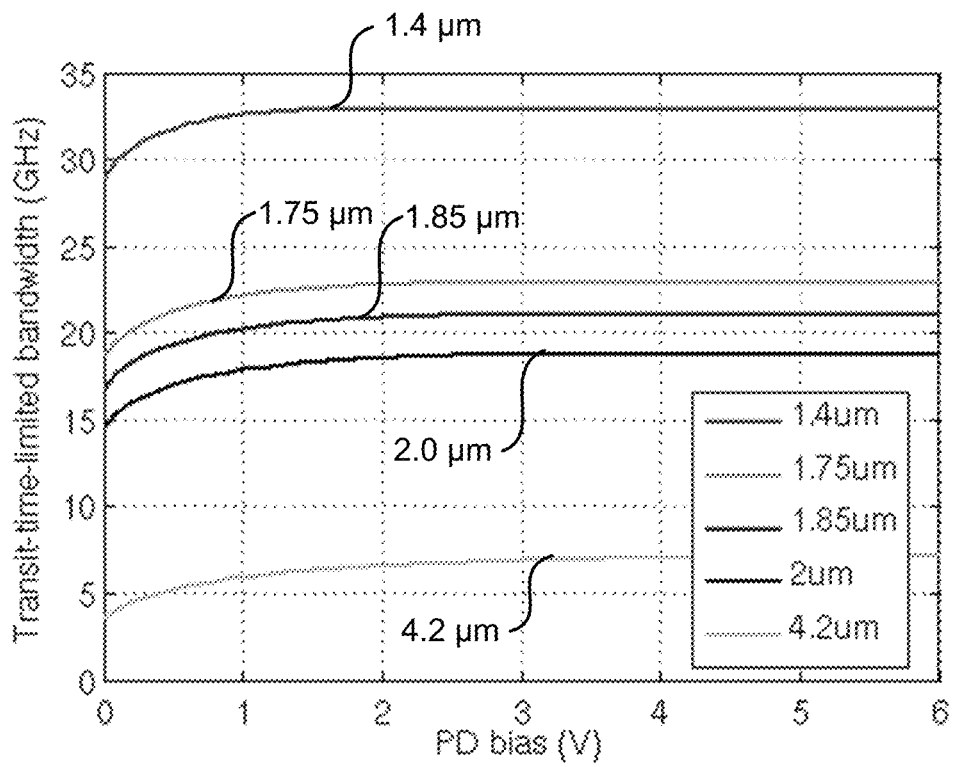

FIGS. 5 & 6 are graphs relating to example characteristics of the photodetector 104 made using germanium (Ge PDs). Ge PDs absorb photons and generate electrons and holes. In a Ge PD with wide PIN junction, the generated electrons and holes take longer to transit to electrode terminals than a Ge PD with a narrower PIN junction. An amount of time for electrons and holes to reach the electrode terminals limits an electrical bandwidth of the Ge PD. FIG. 5 shows that for increased voltage, electron and hole drift velocities saturate (i.e., above a certain voltage an increase of voltage does not increase drift velocity). FIG. 6 depicts simulations of electrical bandwidth versus voltage of Ge PDs having different widths (e.g., 1.4, 1.75, 1.85, 2.0, and 4.2 µm widths). According to FIG. 6, Ge PDs that have a waveguide width greater than 2 µm has an electrical bandwidth less than 20 GHz (in some embodiments, 20 GHz is used to achieve 25 Gb/s operation). Yet a waveguide of 2 µm wide may support only 10 optical modes at wavelengths of about 1.3 µm. In some embodiments, a photodetector with a width from 0.25 µm to 2.5 µm is used; from 0.5 µm to 2.0 µm; or from 1.3 µm to 1.9 µm; or 1.4 µm to 1.85 µm.

Figure 7:
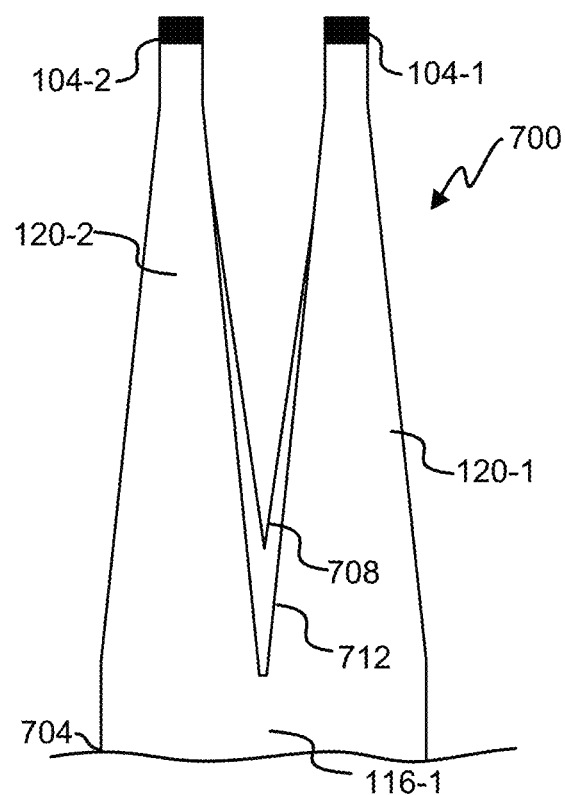
FIG. 7 depicts an embodiment of a splitter for connecting two photodetectors to an output waveguide.

Referring next to FIG. 7, an embodiment of splitter 700 for connecting two photodetectors 104 to an output waveguide 116 is shown. The splitter 700 comprises an input side 704. The input side 704 is part of the output waveguide 116. The splitter 700 receives light from the output waveguide 116 at the input side 704 and separates the light from the output waveguide 116 into a first branch 120-1 and a second branch 120-2. The first branch 120-1 tapers and guides light into the first photodetector 120-1. The second branch 120-1 tapers and guides light into the second photodetector 104-2. Direction of beam propagation is in a direction from the input side 704 to the photodetector 104.

The output waveguide 116 supports multiple transverse modes. In some embodiments, the splitter 700 is symmetrical. Light guided in odd-numbered modes (e.g., 2n−1 modes, where n is a positive integer) and even-numbered modes (e.g., 2n modes) will mostly be coupled into the branch 120 (e.g., into an nth mode).

Simulations indicate that coupling loss can be reduced with design of the splitter 700. For example, the splitter 700 uses tapers to reduce coupling loss. In some embodiments, the tapers comprise two portions: a shoulder taper 708 and a ridge taper 712. A shoulder taper is a lower portion (e.g., lower being closer to a substrate than the ridge) of the splitter 700. The ridge is an upper portion of the splitter 700. The ridge taper 712 narrows first, in a direction of beam propagation, then the shoulder taper 708 narrows. In the embodiment shown, the shoulder taper 708 and the ridge taper 712 are on an inside part of the splitter 700 and not on an outside of the splitter 700, thus a branch 120 is asymmetrical even though the splitter 700 is symmetrical. In some embodiments, a shoulder taper and a ridge taper are used on outside tapers of the branch 120. In some embodiments, a width of a branch before tapering is equal to or greater than 4 μm and equal to or less than 9 μm.

Widths of branches 120 are tapered before connecting to a photodetector 104. In some embodiments, an advantage for using two branches 120 is that each branch 120 needs to support only half the optical modes of the output waveguide 116. Thus a width of a photodetector 104 coupled to a branch 120 can be out half a width of a photodetector coupled to an output waveguide 116. Having a width about half doubles a carrier transmit-time limited electrical bandwidth. Photodetectors 104 are electrically connected in parallel for detecting light in a channel. Connecting photodetectors 104 in parallel for a channel can increase (e.g., double for two photodetectors 104 per channel) capacitance for that channel. Photodetector design can be optimized for small capacitance.

Figure 8:
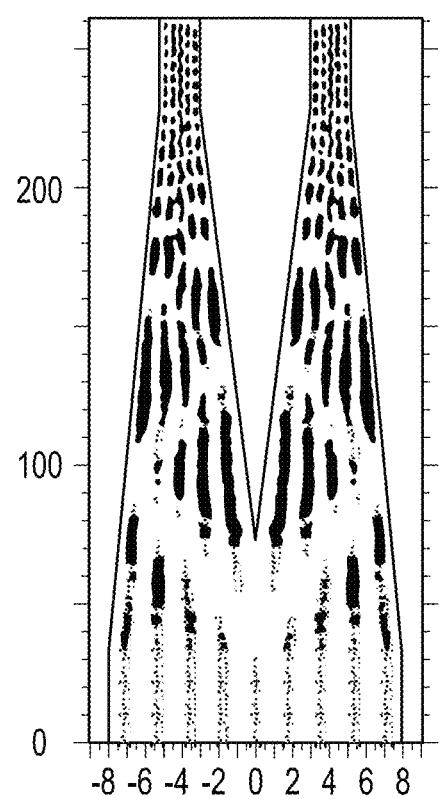
FIGS. 8, 9, and 10 depict examples of optical modes in a splitter.
Figure 9:
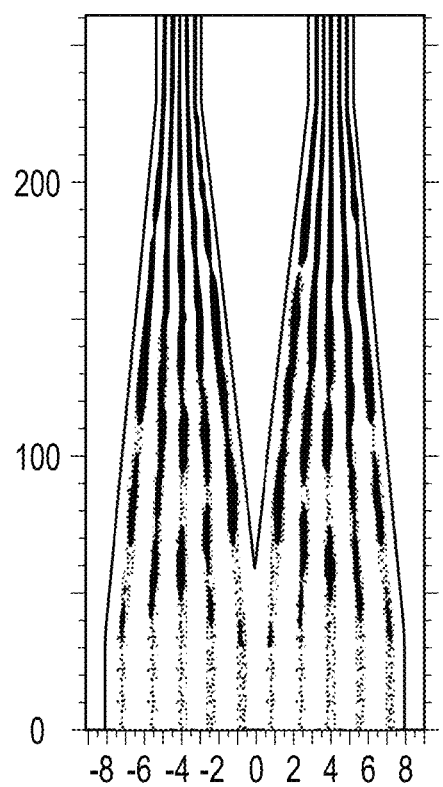
Figure 10:
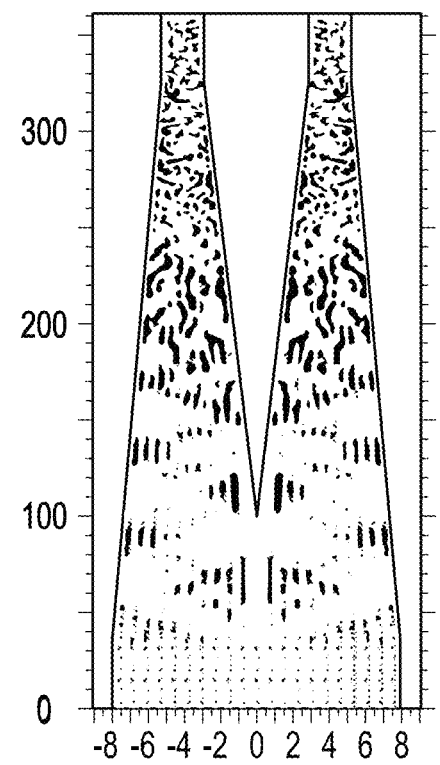

Referring next to FIGS. 8, 9, and 10, examples of optical modes in splitter 700 are shown. FIG. 8 shows a simulation of a TE $9^{th}$ mode in the splitter 700. FIG. 9 shows a simulation of a TE $10^{th}$ mode in the splitter 700. FIG. 10 shows a simulation of a TE $21^{st}$ mode in the splitter 700. In some embodiments, a length of the splitter 700 is between 150 μm to 450 μm or 175 μm and 350 μm (e.g., splitter 700 length is equal to 175, 200, 225, 250, 275, 300, or 350 μm; or a value between 175, 200, 225, 250, 275, 300, and/or 350 μm). In some embodiments, a width of the branch 120 narrows from between 7.5 and 8 μm (e.g., 7.6, 7.75, 7.85, 7.95 μm) to a width of between 1.5 and 2 μm (e.g., 1.4, 1.75, 1.85, or 2.0 μm) because simulations show those dimensions for splitters are a good tradeoff between splitter 700 length and tolerable losses.

Figure 11:
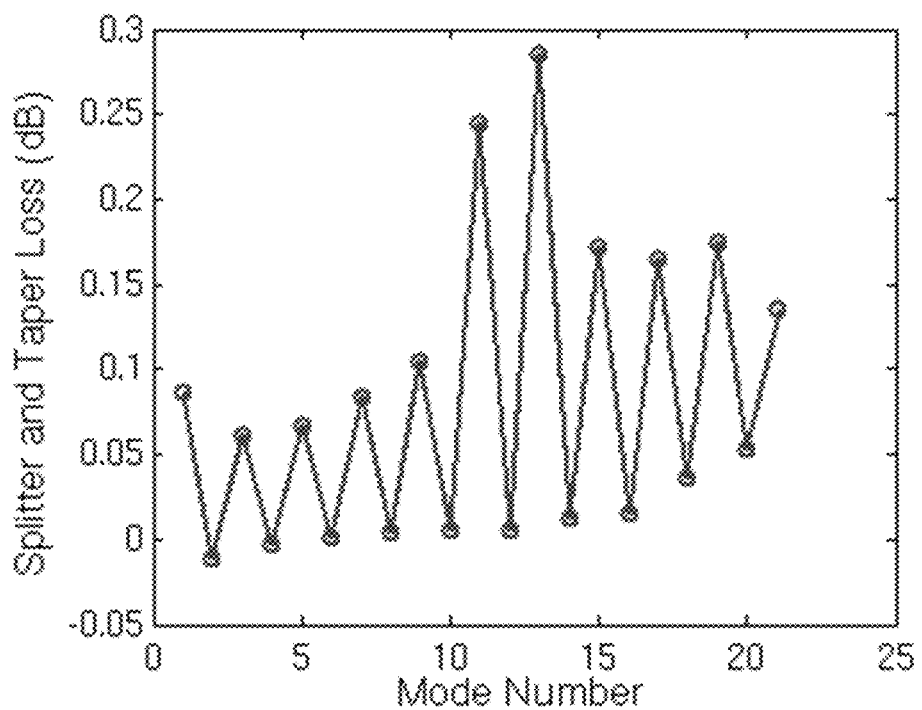
FIG. 11 depicts a plot of simulated loss of the splitter versus mode number.

Referring next to FIG. 11, a plot of simulated loss versus mode number is shown. An output waveguide 116 has an initial width of 16 μm, which is reduced to two branches 120, each branch 120 having an initial width of 7.85 μm. Each branch then tapers to a width of 2 μm over a 300 μm length. Simulations show that even a $21^{st}$ mode has relatively small loss (e.g., <0.3 dB). FIG. 11 shows that even-numbered modes have less loss than odd-numbered modes. That is reasonable considering symmetry of even-numbered modes not having a mode with a peak in a center the splitter 700.

In some embodiments, the output waveguide 116 is tapered then split (e.g., width of the output waveguide 116 tapers from 16 μm to 4 μm and then splits into two branches 120). In some embodiments, the output waveguide splits and then tapers (e.g., splits from a width of 16 μm into two branches that are each about 8 μm wide, then tapers). Intermediate variations are also possible. Splitting before tapering can reduce loss because an initial separation between branches is finite based on fabrication tolerances; and a finite initial separation has less impact on a wider waveguide than a narrower waveguide.

Figure 12:
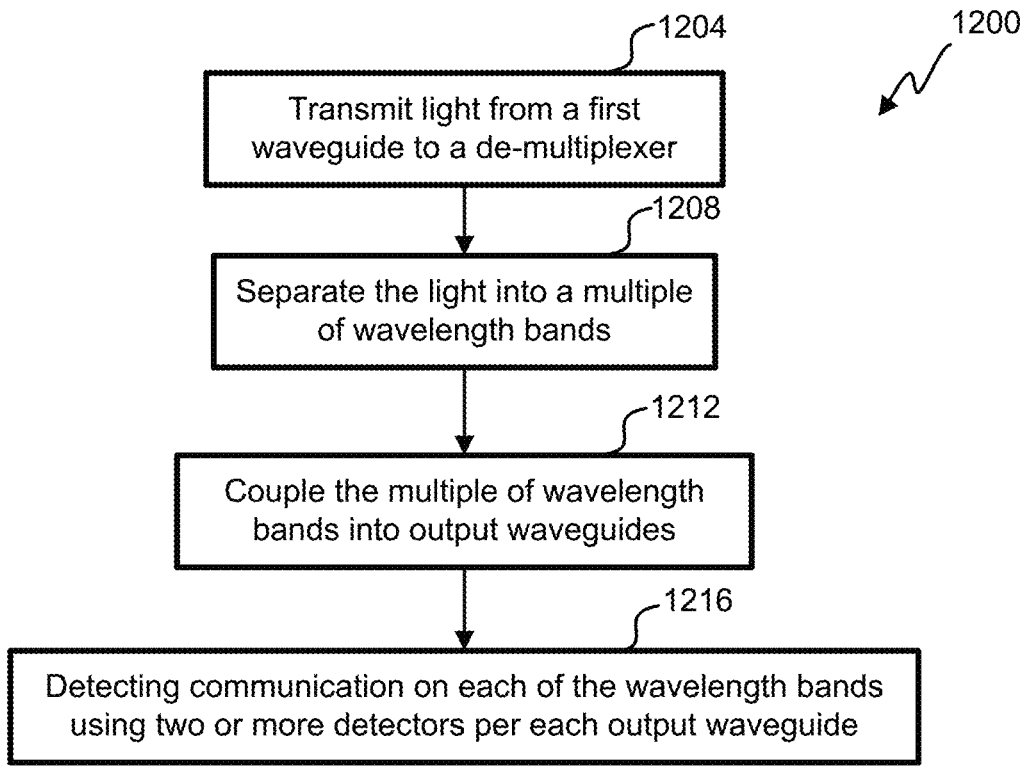
FIG. 12 depicts a flowchart of an embodiment of a method for using an optical receiver in wavelength-division multiplexing.

Referring next to FIG. 12 a flowchart of an embodiment of a method for using an optical receiver in wavelength-division multiplexing is shown. Light comprising a multiple of wavelength bands is transmitted into a first waveguide (e.g., the input waveguide 108). The multiple of wavelength bands correspond to a plurality of communication channels. In step 1204, light from the first waveguide is transmitted to a demultiplexer (DeMux) (e.g., demultiplexer 112). The DeMux separates the multiple of wavelength bands, step 1208, and transmits the multiple of wavelength bands to a plurality of output waveguides 116. Light is coupled from the DeMux into the plurality of output waveguides 116, step 1212; each of the plurality of output waveguides 116 receives a wavelength band corresponding to a single channel of the plurality of communication channels. In step 1216, two or more detectors per each output waveguide 116 are used to detect communication on each of the wavelength bands. For example, the plurality of output waveguides 116 includes a second waveguide (e.g., the first output waveguide 116-1). Two or more photodetectors (e.g., the first photodetector 104-1 and the second photodetector 104-2) coupled with the second waveguide are used to detect light coupled into the second waveguide.

Figure 13:
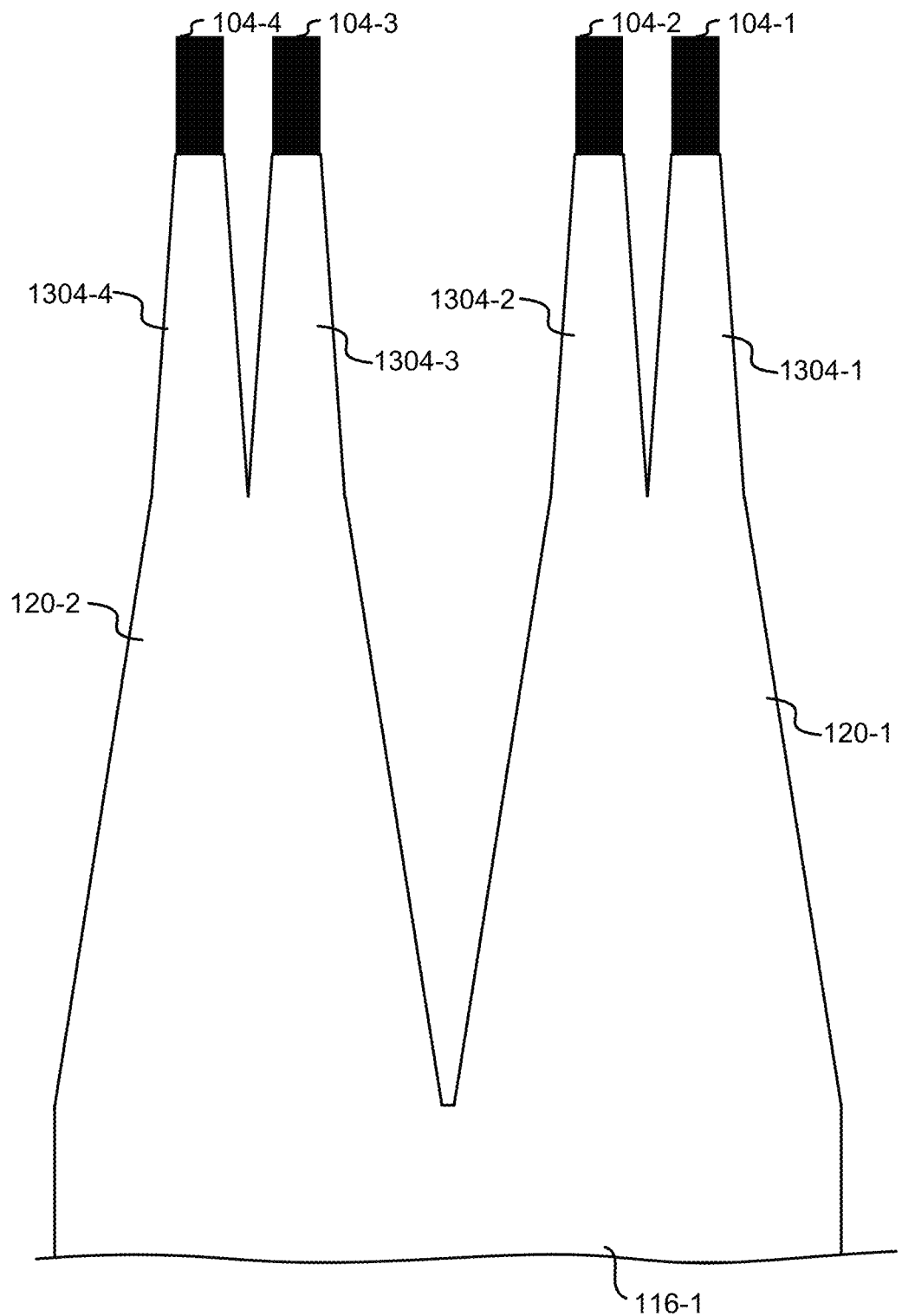
FIG. 13 depicts an embodiment of a splitter for connecting two photodetectors to an output waveguide of a demultiplexer.

It is possible to split each output waveguide into two, three, four, or more branches depending on an application. FIG. 13 is an embodiment of splitter 1300 separating light to four photodetectors 104. Light from an output waveguide 116 is separated into a first branch 120-1 and a second branch 120-2. The first branch 120-1 is split into a first sub-branch 1304-1 and a second sub-branch 1304-2. The second branch 120-2 is split into a third sub-branch 1304-3 and a fourth sub-branch 1304-4. Thus four photodetectors 104 are used for each channel.

In some embodiments, more photodetectors 104 are used per channel to increase electrical bandwidth. For example, four photodetectors 104, each 1 μm wide could be used, instead of two photodetectors 104, each 2 μm wide, thus increasing electrical bandwidth of the system to about 40 GB/s.

In some embodiments, binary branching (each splitting step has only two subsequent branches) is used to reduce loss at branching. In some embodiments, other branching is used (e.g., three branches) to shorten a length of a splitter.

The specific details of particular embodiments may be combined in any suitable manner without departing from the spirit and scope of embodiments of the invention. For example, splitting waveguides could be used to increase communication bandwidth of other systems using lateral PIN junctions. For example, waveguides of an AWG could be split into branches and into multiple photodetectors per channel. Further, more than four photodetectors per channel could be used. For example, 6, 8, 12, or 16 photodetectors per channel could be used. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to explain the principles of the invention and its practical applications to thereby enable others skilled in the art to utilize the invention in various embodiments and with various modifications as are suited to the particular use contemplated.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary.

All patents, patent applications, publications, and descriptions mentioned here are incorporated by reference in their entirety for all purposes. None is admitted to be prior art.

What is claimed is:

1. An optical receiver comprising:
   a waveguide optically coupled with a demultiplexer, wherein the waveguide has a width;
   a splitter that divides the waveguide into a first branch and a second branch, wherein the first branch and the second branch each have a width narrower than the width of the waveguide, and wherein the first branch supports less transverse optical modes than the waveguide;
   a first photodetector optically coupled with the first branch; and
   a second photodetector optically coupled with the second branch, wherein the second photodetector is electrically coupled in parallel with the first photodetector.

2. The optical receiver of claim 1, wherein the first branch tapers from the splitter toward the first photodetector, such that the first branch is more narrow at the first photodetector than at the splitter.

3. The optical receiver of claim 1, wherein the first photodetector has a width equal to or less than 2.0 microns and equal to or greater than 0.5 microns.

4. The optical receiver of claim 1, wherein:
   the width of the waveguide is measured at a plane where the waveguide couples with the demultiplexer; and
   the width is equal to or greater than 14 microns and equal to or less than 20 microns.

5. The optical receiver of claim 1, wherein the first branch is less than half the width of the waveguide.

6. The optical receiver of claim 1, wherein:
   the splitter is a first splitter;
   the optical receiver comprises a second splitter that divides the second branch into a first sub-branch and a second sub-branch;
   the second photodetector is optically coupled with the first sub-branch; and
   a third photodetector is optically coupled with the second-sub branch.

7. The optical receiver of claim 6, wherein the third photodetector is electrically coupled in parallel with the first photodetector and with the second photodetector.

8. The optical receiver of claim 7, further comprising a fourth photodetector electrically coupled in parallel with the first photodetector, with the second photodetector, and with the third photodetector.

9. The optical receiver of claim 1, wherein:
   the waveguide tapers from the demultiplexer to the splitter; and
   the waveguide is narrower at the splitter than at the demultiplexer.

10. The optical receiver of claim 1, wherein the waveguide, the splitter, the first branch, and the second branch are formed in crystalline silicon.

11. The optical receiver of claim 3, wherein the second photodetector has a width equal to or less than 2 microns.

12. The optical receiver of claim 11, further comprising a third photodetector and a fourth photodetector, wherein the first photodetector, the second photodetector, the third photodetector, and the fourth photodetector are electrically coupled in parallel.

13. A method comprising:
   guiding a beam of light in a waveguide to propagate from a demultiplexer toward a splitter;
   splitting the beam of light into a first branch and a second branch, the first branch supporting less transverse optical modes than the waveguide;
   guiding light in the first branch toward a first photodetector;
   guiding light in the second branch toward a second photodetector;
   detecting light using the first photodetector; and
   detecting light using the second photodetector, wherein the first photodetector and the second photodetector are electrically coupled in parallel.

14. The method of claim 13, wherein the waveguide, the first branch, the second branch, the first photodetector, and the second photodetector are integrated on a common substrate.

15. The method of claim 13, wherein the first branch tapers from the waveguide toward the first photodetector, such that the first branch is more narrow at the first photodetector than at the waveguide.

16. The method of claim 13, wherein the first branch is less than half a width of the waveguide.

17. The method of claim 13, further comprising:
   splitting light in the second branch into a first sub-branch and a second sub-branch, wherein the second photodetector detects light in the first sub-branch; and
   detecting light in the second sub-branch with a third photodetector, wherein the third photodetector is electrically coupled in parallel with the first photodetector and the second photodetector.

18. The method of claim 17, further comprising detecting light using a fourth photodetector, wherein the fourth photodetector is electrically coupled in parallel with the first photodetector, with the second photodetector, and with the third photodetector.

19. The method of claim 13, wherein the first photodetector has a width equal to or less than 2.0 microns and equal to or greater than 0.5 microns.

20. The method of claim 13, wherein a width of the waveguide is measured at a plane where the waveguide couples with the demultiplexer; and
   the width is equal to or greater than 14 microns and equal to or less than 20 microns.

* * * * *